United States Patent [19]

Cramer

[11] Patent Number: 4,680,839
[45] Date of Patent: Jul. 21, 1987

[54] LINK CHAIN, ESPECIALLY A TENTERING CHAIN

[75] Inventor: Hans Cramer, Aachen, Fed. Rep. of Germany

[73] Assignee: H. Krantz GmbH & Co., Aachen, Fed. Rep. of Germany

[21] Appl. No.: 766,898

[22] Filed: Aug. 16, 1985

[30] Foreign Application Priority Data

Mar. 26, 1985 [DE] Fed. Rep. of Germany ....... 3510856

[51] Int. Cl.⁴ ............................................. D06C 3/02
[52] U.S. Cl. ...................................... 26/89; 411/514
[58] Field of Search ................... 26/89; 474/206, 208, 474/219, 221, 223–225, 227–235; 411/363, 364, 365, 513, 514, 515; 59/85, 901

[56] References Cited

U.S. PATENT DOCUMENTS

| 617,137 | 1/1899 | Anthony | 474/228 X |
| 1,614,395 | 1/1927 | Roemer | 26/89 |
| 1,624,111 | 4/1927 | Mullally | 474/231 |
| 2,541,157 | 2/1951 | Fulke | 474/224 |
| 2,703,020 | 3/1955 | Fish | 474/223 |

FOREIGN PATENT DOCUMENTS

| 8425400 | 11/1984 | Fed. Rep. of Germany. | |
| 349718 | 6/1931 | United Kingdom | 474/219 |
| 245501 | 3/1970 | U.S.S.R. | 411/514 |

*Primary Examiner*—Robert R. Mackey
*Attorney, Agent, or Firm*—W. G. Fasse; D. H. Kane, Jr.

[57] ABSTRACT

The links (1) of a chain such as a tentering chain are respectively connected to each other by pins (6). In order to secure the pin against rotating and against axial shifting, an end of the pin (6) protruding beyond an outer surface of a lug (2) of the chain link (1) is provided with a radial bore (7) into which one prong (8) of a two pronged spring clip element (9) is inserted. The other prong (10) of the spring clip element (9) partially encircles the protruding end of the pin (6). A shoulder (14) projects from the outer surface of the lug (2) and a groove (13) extends into said shoulder so that a bottom (12) of the groove (13) forms a stop surface perpendicular to the lug plane. One end (15) of the one prong (8) and a transition part (11) between the two prongs (8, 10) rest against the stop surface for securely holding the spring clip element in place.

6 Claims, 3 Drawing Figures

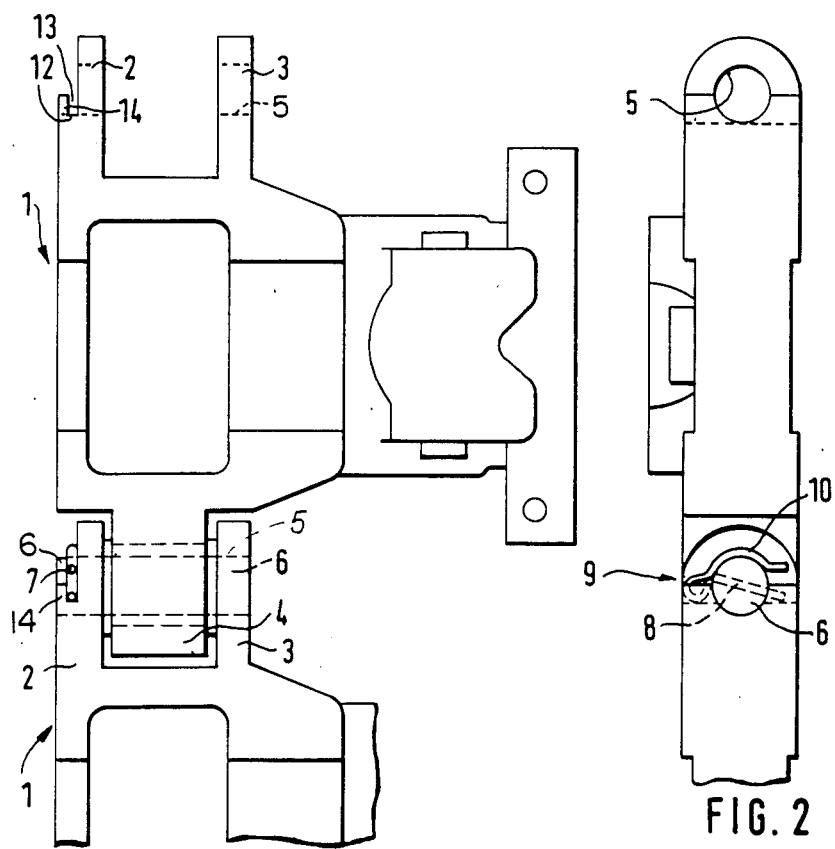
FIG. 1
FIG. 2
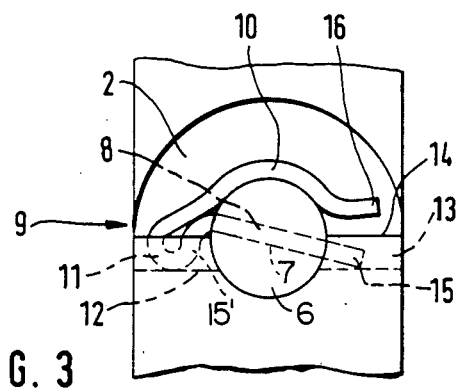
FIG. 3

LINK CHAIN, ESPECIALLY A TENTERING CHAIN

FIELD OF THE INVENTION

The invention relates to a chain, such as a tentering chain, made of chain links each having a connection lug pair at one end of a link body and a connection tongue at the opposite end of the link body. Consecutive adjacent chain links are hingingly connected by a connecting pin held in a rotationally rigid manner in aligning bored holes of the connection lug pair and in the tongue.

DESCRIPTION OF THE PRIOR ART

It is known to keep the connecting pin in place by a spring element removably secured at an end of each connecting pin protruding beyond an outer surface of the respective connection lug, whereby the spring element extends beyond the diameter of the bored hole of the connection lug and rests against the outer surface of the corresponding connection lug. This spring element is preferably a U-shaped or two-pronged retaining clip having an essentially straight shank extending through a radially bored hole of the connecting pin and a bow-shaped shank lying against a surface portion of the circumference of the connecting pin. The outer surface of the connection lug facing the spring element comprises a step, whereby the parts of the spring element protruding beyond the connecting pin circumference rest against a surface extending perpendicularly from the connection lug plane.

Such chains are used, for example, as tenter frame chains for a width-guided transport of a belt of goods, such as a textile web, through a heat processing apparatus. The separate chain links are provided with a carrier for receiving a tenter hook and/or a pin strip in order to grasp and hold the edge of the band of goods. In order that the pins connecting the chain links to each other are not subjected to increased wear, in known chains the pin shaft extending through the bored holes of the connection lug pair is provided with a rifled surface, which achieves a rotationally rigid connection with the internal bore surfaces. However, for preventing the pins from accidentally shifting axially, one end of each pin comprises a collar which protrudes beyond the bore diameter of the hole in the connection lug. This collar may be counter-sunk or set into a recess in the corresponding connection lug. The opposite end of the connecting pin comprises a ring groove. A Seeger-type circlip may be set into this ring groove so that it rests against the outer surface of the corresponding connection lug, whereby the connecting pin is sufficiently secured against undesired rotation as well as against axial shifting.

However, for sufficiently securing the connecting pin against rotation, the rifled surface of the pin must protrude considerably beyond the diameter of the bored hole, so that the pin may only be inserted into the bored hole with a substantial axial force. The impact force applied to the pin for driving it into the bored holes also causes great stress in the connection lugs, whereby they may be damaged or even broken. Often, notches and cracks are formed in the connection lugs extending out over the rifling of the pin, so that lug breakage occurs under operating stress in the chain, leading to expensive "down time" and repairs. Besides, repeatedly inserted and removed pins suffer from a blunting of the rifling and may therefore not be sufficiently secured against rotation in the connection lugs. Furthermore, the danger exists that if a connecting pin is not sufficiently driven through both connection lugs, the Seeger-type circlip will not engage the ring groove as required, so that the clip may jump off of the pin during operation of the chain.

German Utility Model (DE-GM) 8,425,400 also discloses a chain of this type, wherein the connecting pins may be repeatedly remounted in a rotationally secured manner without stressing the connection lugs, and further wherein the spring element securing the pin against axial shifting cannot jump off of the pin. These advantages are achieved by a spring element which is essentially a U-shaped or two-pronged clip having an elongated or straight pring extending through a radial bored hole in the connecting pin and a bow-shaped prong rests against the outer surface of the pin. The outer surface of the connection lug facing the sping element comprises a step-shaped protrusion whereby the parts of the essentially straight prong of the spring clip which projects radially from the connecting pin, rest against the protrusion surfaces extending perpendicularly to the plane of the lugs or rather to an outer surface of the respective lug.

In this known chain, the end of the pin opposite of the spring element requires a head protruding beyond the bore diameter of the corresponding lug, in order to prevent an axial shifting of the pin. Furthermore, the pins require a groove in the area of the spring element, in order to secure this spring element to the pin.

OBJECTS OF THE INVENTION

In view of the foregoing it is the aim of the invention to achieve the following objects singly or in combination:

to construct the links of a link chain made of the type mentioned in such a way that the connecting pins will be secured against rotating and axial shifting even without using an enlarged flange-type pin head and without requiring a groove in the surface of the pin for retaining a spring clip on the connecting pin;

to achieve such securing of a connecting pin without subjecting the pin or connection lugs to high impact forces, thereby avoiding damaging or breaking of the links, especially the connecting lugs;

to allow the repeated removal and remounting of the connecting pins and their associated retaining clips, in a simple manner which does not damage the pin or clip and which does not require a large axial force for the insertion of the pins when joining adjacent links; and to avoid using pins with a rifled surface.

SUMMARY OF THE INVENTION

The above objects have been achieved in a chain made of chain links having a connection lug pair, according to the invention, whereby the surface extending perpendicularly to the lug plane is formed by the bottom of a groove provided in the step or shoulder running parallel to the adjacent lug surface plane.

According to the invention, a rigid securing of the pin against rotation as well as against axial shifting in either direction is achieved without requiring that the pin comprise an enlarged head on one end in order to secure it. The rotational securing is achieved in an essentially known manner in that the outer surface of the lug facing the spring clip forms a step or shoulder, and the parts of the spring clip element which protrude radially beyond the connecting pin rest against a surface of this shoulder running perpendicular to the lug plane. Since this surface is defined according to the invention by the bottom of a groove in the step running parallel to the lug plane, the parts of the spring clip element protruding into this groove serve to secure the spring clip axially in both directions while simultaneously securing the pin against rotation. Thus, the pin can neither rotate nor shift axially.

According to one embodiment of the invention, a transition part or loop of the spring clip element, located between the essentially straight prong and bow-shaped prong, at least partially reaches into the groove of the step or shoulder.

Due to the shape of the spring and the arrangement of the parts of the spring protruding beyond the connecting pin cross-section and by means of the spring elastic characteristic, tolerances in the contact area of the spring clip element may be compensated in a simple manner.

The simple removability of the spring clip element is especially assured if, according to an embodiment of the invenion, an end piece of the bow-shaped prong of the spring clip extends in a straight line oriented at a sharp or acute angle relative to the essentially straight prong of the spring clip which reaches partially into the groove of the step. In this embodiment, the essentially U-shaped or two pronged clip spring may also especially easily be applied, since the straight end piece of the bowed prong, due to its angular orientation, makes possible a continuous spreading of the clip spring prongs as the spring clip is pressed onto the connecting pin. The angular orientation of the straight end piece simplifies removal of the spring clip in a known manner by means of expansion pliers.

BRIEF DESCRIPTION OF THE DRAWINGS

In order that the invention may be clearly understood, it will now be described, by way of example, with reference to the accompanying drawings, wherein:

FIG. 1 is a top view of two inteconnected chain links, one of which is only partially shown.

FIG. 2 is a side view of the chain links according to FIG. 1; and

FIG. 3 is an enlarged view of the connection area of two chain links shown in FIG. 2.

DETAILED DESCRIPTION OF PREFERRED EXAMPLE EMBODIMEMTS AND OF THE BEST MODE OF THE INVENTION:

As shown in FIG. 1, a chain link has a link body 1 comprising a pair of connection lugs 2 and 3 at one end, which enclasp a connection tongue 4 of a neighboring chain link body 1. The lugs 2, 3, and the connection tongue 4 are provided with aligning through-holes 5, through which a cylindrical connecting pin 6 is inserted. The pin 6 has a uniform diameter throughout its length.

One end of the pin 6 ends flush with the outer surface of the lug 3 while the other end of the pin 6 slightly protrudes beyond the outer surface of the lug 2. The protruding portion of the pin 6 comprises a radial bore hole 7 through which an elongated straight first prong 8 of a double pronged spring clip element 9 extends, as shown in FIGS. 2 and 3. A bow-shaped second prong 10 of the spring clip 9 encircles the pin 6 around a portion of its cylindrical circumference. The first prong 8 has a straight outer end 15 and an angled end 15' merging into a transition part or loop 11 of the spring clip 9. The loop 11 connects the angled end 15' of the first prong 8 to the bow-shaped prong 10. The outer end 15 of the first prong 8 and the transition loop 11 rest against a bottom 12 of a groove 13 in a shoulder 14 protruding from the lug 2. The bottom 12 thus forms a stop surface extending perpendicularly to the plane or outer surface of the lug 2. Since the outer prong end 15 and the loop 11 can rest in the groove 13 due to the angled end 15' of the prong 8, the cylindrical pin 6 is secured against rotation as well as against axial shifting.

In order to allow a repeated simpler installation and removal of the spring clip 9, an end part 16 of the bow-shaped prong 10 extends in a straight line at a sharp or acute angle with respect to the end part 15. The shoulder 14 may be provided with a semicircular hole into which an outer end of the pin 6 extends or it may provide a stop for the outer end of the spring.

Although the invention has been described with reference to specific example embodiments, it is to be understood, that it is intended to cover all modifications and equivalents within the scope of the appended claims.

What I claim is:

1. A link for a chain, comprising a link body, a pair of connecting lugs (2, 3) projecting from one end of said link body, a connecting tongue (4) projecting from an opposite end of said link body, a spacing between said connecting lugs for receiving a connecting tongue of a neighboring link body, axially aligned holes in said connecting lugs and in said connecting tongue, a cylindrical connecting pin having a uniform diameter throughout its length extending through said axially aligned holes, said cylindrical connection pin having an end portion projecting laterally and axially outwardly from an outer wall surface of one of said connecting lugs, said end portion of said cylindrical connecting pin having a radial through-bore (7), a two-pronged locking spring (9) having a first prong (8) extending through said through-bore, and a second prong (10) engaging said cylindrical connecting pin, said first prong (8) having a first straight prong end (15) and a second prong end (15') angled away from said second prong (10), both prong ends extending out of said radial through-bore (7), said one connecting lug having a lateral outwardly extending shoulder (14), a groove (13) in said shoulder (14) extending in parallel to said outer wall surface for receiving said first and second prong ends, a groove bottom (12) in said groove (13), said first prong (8) extending at an angle to said groove bottom, said groove (13) having such a depth that said first straight prong end and said second angled prong end of said first prong (8) rest against said groove bottom for securely holding said locking spring in a pin locking position and for preventing any axial movement of said cylindrical connecting pin.

2. The link chain of claim 1, wherein said locking spring comprises a transition loop (11) interconnecting said angled prong end of said first prong (8) to said second prong (10) of said locking spring (9), said transition loop (11) reaching at least partially into said groove to rest against said groove bottom.

3. The link chain of claim 2, wherein said first prong (8) is straight while said second prong (10) is curved.

4. The link chain of claim 3, wherein said second curved prong (10) has a substantially straight end (16) forming a free end of said curved prong, said free end enclosing an acute angle with said straight prong (8) reaching into said groove (13), said curved prong engaging said cylindrical connecting pin.

5. The link chain of claim 3, wherein said groove bottom (12) extends perpendicularly to said outer wall surface.

6. The link chain of claim 1, wherein said shoulder (14) has a hole in alignment with said holes in said connecting lugs and in said connecting tongue for receiving part of said end portion of said cylindrical connecting pin.

* * * * *